Figure 1:
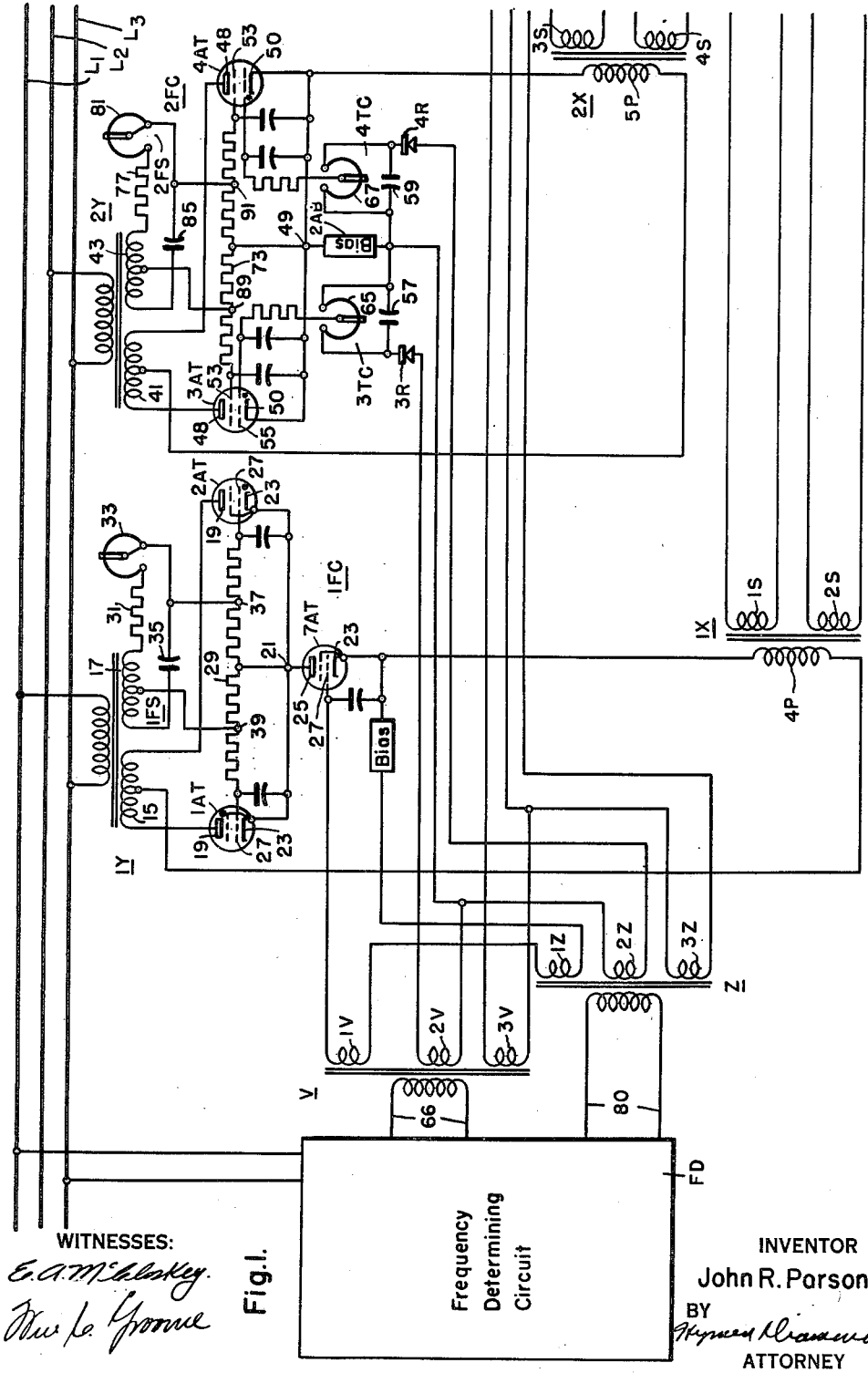

Feb. 5, 1957   J. R. PARSONS   2,780,750
HEAT CONTROL FOR FREQUENCY CONVERTER CONTROL
Filed Jan. 26, 1951   4 Sheets-Sheet 1

WITNESSES:
E. A. McCloskey
[signature]

INVENTOR
John R. Parsons.
BY
[signature]
ATTORNEY

Feb. 5, 1957  J. R. PARSONS  2,780,750
HEAT CONTROL FOR FREQUENCY CONVERTER CONTROL
Filed Jan. 26, 1951  4 Sheets-Sheet 2

WITNESSES:
E.A. McCloskey
New L. Groome

INVENTOR
John R. Parsons.
BY
Hymen Diamond
ATTORNEY

United States Patent Office 2,780,750
Patented Feb. 5, 1957

2,780,750

HEAT CONTROL FOR FREQUENCY CONVERTER CONTROL

John R. Parsons, Kenmore, N. Y., assignor to Westinghouse Electric Corporation, East Pittsburgh, Pa., a corporation of Pennsylvania Application January 26, 1951, Serial No. 208,071

16 Claims. (Cl. 315—144)

My invention relates to electric discharge apparatus, and it has particular relation to control apparatus for resistance welding.

The present application in its specific aspects is directed to an improvement over the apparatus shown and described in my Patent 2,619,591, dated November 25, 1952, and assigned to Westinghouse Electric Corporation. In that pending application a control for a low-frequency welding system is disclosed. This control includes three major components—a power-supply circuit including electric discharge devices through which current is supplied directly to the primary of the welding transformer; a circuit for controlling the conductivity of the discharge devices in the power circuit which may be called a firing-control or heat-control circuit; and a circuit which may be called a frequency-control circuit, for determining the frequency and other characteristics of the current supplied by the power circuit and the duration of the flow of this low-frequency current.

The firing-control circuit of my pending application has in practice operated satisfactorily. It is, however, of relatively complex structure including six auxiliary valves, a polyphase transformer with an associated polyphase voltage-divider network for supplying anode potential to these valves, and six transformers four of which each interconnect the anode circuits of one of the six auxiliary valves and the grid circuits of succeeding valves.

It is accordingly a specific object of my invention to provide a firing-control circuit of relatively simple structure for a low-frequency welder control.

Another object of my invention is to provide a low-cost firing-control circuit for the control of a low-frequency welder.

A general object of my invention is to provide a converter for deriving power from a commercial supply and supplying power at a substantially lower frequency than that of the supply to a load, which shall include a circuit of relatively simple structure and low cost for controlling the magnitude of the load current supplied.

An ancillary object of my invention is to provide a novel circuit including an electric discharge device having a plurality of control electrodes or grids.

Another ancillary object of my invention is to provide a novel electronic circuit for producing successive pulses at predetermined instants in the pulsations of a polyphase supply.

My invention arises from the realization that the high cost of the firing-control circuit of my earlier application is essentially involved in the anode power supply for the firing-control thyratrons 1CT to 6CT.

In particular, the resistors 40, 41, 42 whereby a neutral is established and the voltage dividers 37, 38, and 39 are costly.

Broadly, the firing-control circuit in accordance with my invention is applicable to converters of many types, and the individual circuit elements of this firing-control circuit are generally applicable for various purposes. In accordance with the specific aspects of my invention, however, the firing-control circuit is applied to a converter in which the load power is derived through a plurality of electric-discharge means, each connected between a pair of phase terminals of a polyphase supply and the load. To render the discharge means conductive, triggering pulses are impressed on them from the firing-control circuit. The pulses must be impressed in succession in synchronism with the phase potentials of the supply, separate pulses being impressed on the electric-discharge means associated with each phase of the supply.

The triggering pulses for each phase of the supply are in accordance with my invention derived from individual pulse-producing networks. Each network is supplied with energizing potential from the phase of the supply for which it produces pulses, and produces the pulses at any desired instants in the half periods, during which it is to function, of this phase of the supply. Each of the networks is supplied with two control parameters, one conditioning the network to produce a pulse and the other causing the pulse to be produced.

Figure 3:
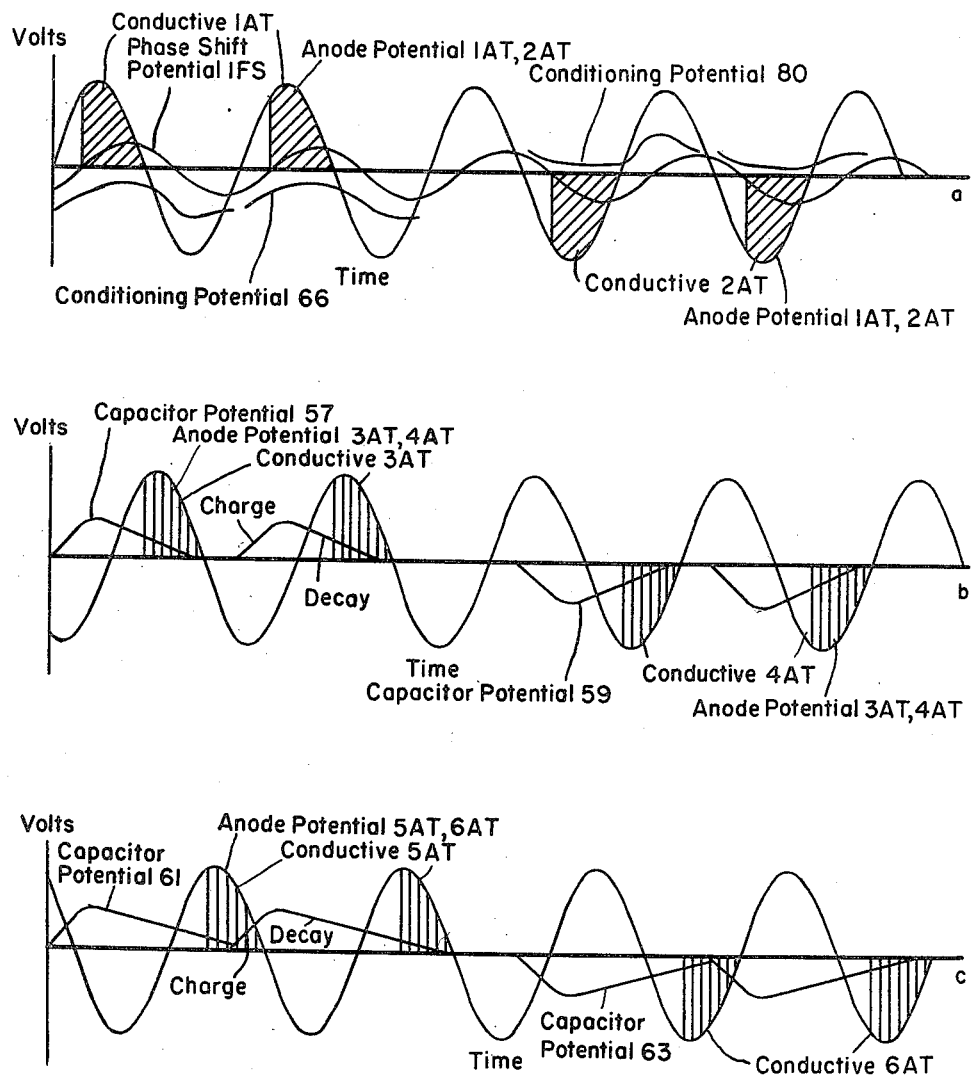

The networks are controlled in accordance with my invention from a frequency-determining circuit analogous or similar to the frequency-determining circuit shown in Fig. 3 of my pending application. This circuit supplies one conditioning pulse during each selected period of the supply during which load current is to be supplied. This conditioning pulse in accordance with my invention conditions the triggering-pulse-producing network, associated with the main discharge means which is to conduct initially, to produce the triggering pulse for the latter discharge means. The triggering pulses are actually produced when a second parameter impressed on the network reaches a proper value at a predetermined instant in the selected period of the supply. The conditioning pulse also conditions the other networks to produce triggering pulses in their turn when the main discharge devices with which they are associated are to conduct. This conditioning is effected through time-constant networks in the respective control networks which maintain such control networks conditioned at least for a sufficiently long time to enable them to produce the triggering pulses in their turn.

Figure 2:
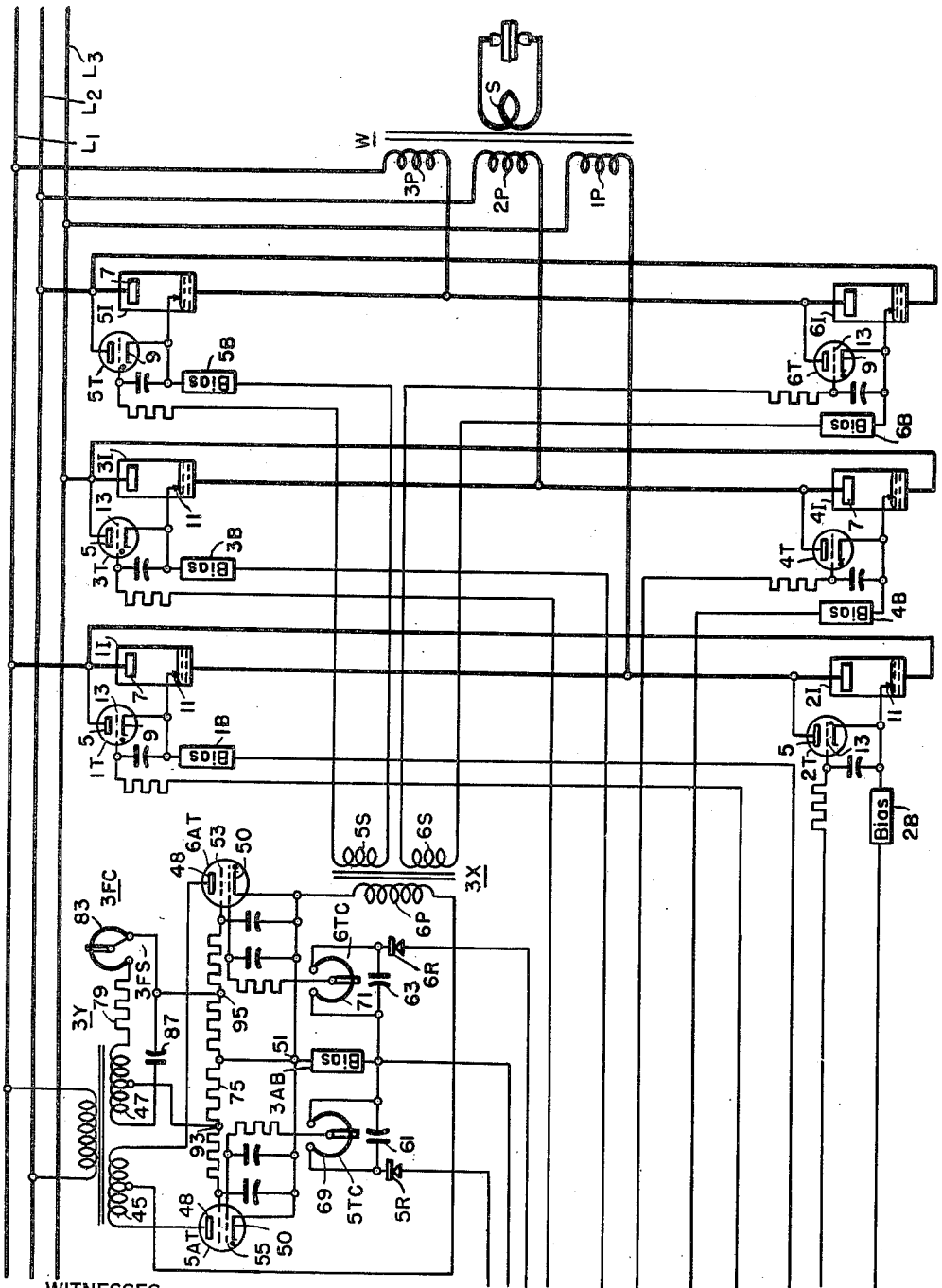
Figure 4:
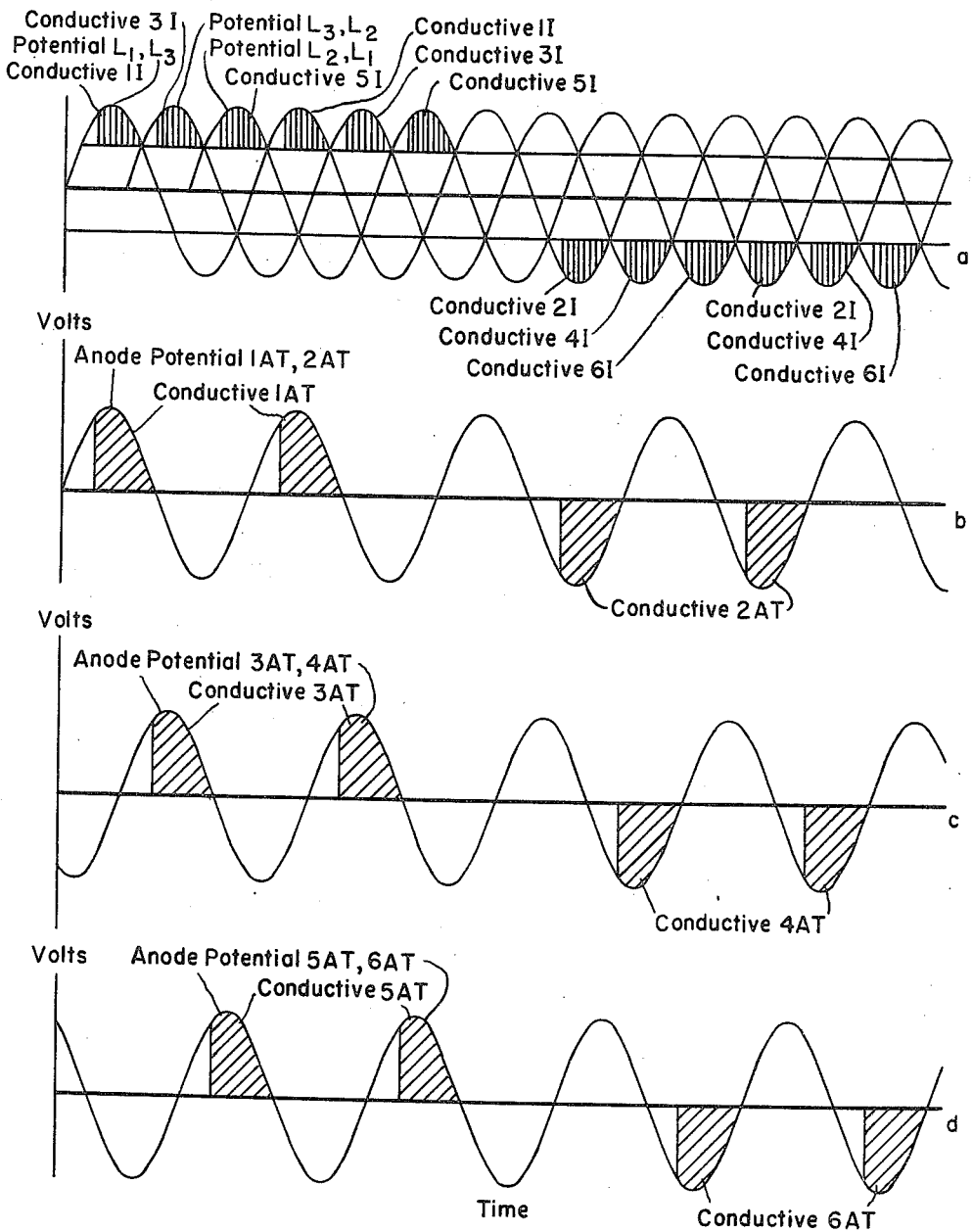

The novel features that I consider characteristic of my invention are set forth with particularity in the appended claims. The invention itself, however, both as to its organization and its method of operation, together with additional objects and advantages thereof, will be understood from the following description of a specific embodiment when read in connection with the accompanying drawings, in which:

Figures 1 and 2 together constitute a circuit diagram of apparatus in accordance with my invention, and Figs. 3 and 4 are graphs illustrating the operation of apparatus shown in Figs. 1 and 2.

The apparatus shown in Figs. 1 and 2 includes a welding transformer W having a plurality of primaries 1P, 2P, and 3P and a single secondary S. Each of the primaries 1P, 2P, 3P is supplied from two of the buses $L_1$, $L_3$; $L_3$, $L_2$ and $L_2$, $L_1$, respectively, of a three-bus, three-phase supply through a pair of ignitrons 1I, 2I; 3I, 4I and 5I, 6I, respectively, connected in antiparallel.

The buses $L_1$, $L_2$, $L_3$ are preferably those of the usual commercial 60-cycle supply. Customarily, such buses are connected to the terminals of a star secondary of a transformer (not shown) associated with the power-generating equipment (owned by a public utility) from which they derive their power. The buses may also derive their power from a delta secondary of a transformer associated with the power-generating apparatus. In certain situations, a step-down transformer (owned by the owner of the welder) may be directly associated with the welder.

and in such situations the buses derive their power directly from the secondary of this transformer.

A firing thyratron 1T, 2T, 3T, 4T, 5T, or 6T is associated with each of the ignitrons 1I to 6I, respectively, the anode 5 of each thyratron being connected to the anode 7 of the asociated ignitron, and the cathode 9 being connected to the igniter 11. The firing thyratrons 1T, 2T; 3T, 4T and 5T, 6T, associated with each pair of phase buses L1, L3; L3, L2 and L2, L1, respectively, of the supply are controlled from a separate transformer 1X, 2X and 3X, respectively. Each of these transformers 1X, 2X, 3X has two secondaries 1S, 2S; 3S, 4S and 5S, 6S, respectively, one (1S, 3S, 5S) connected through a bias 1B, 3B and 5B, respectively, between the control electrode 13 and the cathode 9 of one of the firing thyratrons 1T, 3T, and 5T, respectively, and the other (2S, 4S and 6S) connected between the control electrode 13 and the cathode of the other firing thyratron 2T, 4T and 6T, respectively, through a bias 2B, 4B, 6B. The bias maintains the firing thyratrons normally non-conductive. The thyratrons are rendered conductive when the bias B is counteracted by a triggering pulse supplied through the secondary of the associated transformer 1X to 3X. The primary 4P, 5P, 6P of each of the firing transformers 1X, 2X, 3X is supplied from a separate firing-control network 1FC, 2FC, 3FC, respectively.

For convenience I shall designate the ignitrons 1I and 2I which conduct first during any low-frequency half period "the leading ignitrons"; the phase L1, L3, from which these ignitrons are supplied "the leading phase"; the corresponding firing thyratrons 1T and 2T "the leading thyratrons" and the transformer 1X from which the leading thyratrons are fired the "leading transformer." I shall also designate the firing-control network 1FC which supplies the leading transformer 1X, the "leading firing-control network." The other components I shall call the "following ignitrons," "following thyratrons," the "following firing transformers," and the "following firing-control networks."

The leading firing-control network 1FC is supplied from the leading phase conductors L1, L3 of the supply through a transformer 1Y having a pair of secondaries 15 and 17 each with an intermediate tap. The terminals of one of these secondaries 15 are connected each to an anode 19 of an auxiliary thyratron 1AT and 2AT, respectively. The common junction 21 of the cathodes 23 of the thyratrons is connected to an anode 25 of another auxiliary thyratron 7AT. The cathode 23 of the latter is connected to the intermediate tap of the secondary 15 through the primary 4P of the leading firing-control transformer 1X. The control electrodes 27 of the first-mentioned auxiliary thyratrons 1AT and 2AT are connected together through a resistor 29 having a center tap connected to the junction 21.

A phase-shift network 1FS consisting of a resistor 31, variable resistor 33, and a capacitor 35 is connected across the terminals of the other secondary 17. The junction of the capacitor 35 and the resistor 33 is connected to one intermediate point 37 on the resistor 29, and the intermediate tap of the last-mentioned secondary 17 is connected to a point 39 on the resistor symmetrical electrically with reference to the point 37. Control potentials displaced in phase with reference to the anode potentials by a magnitude dependent on the setting of the phase-shift resistor 33 are thus impressed in the control circuits of the auxiliary thyratrons 1AT and 2AT.

The following firing-control networks 2FC and 3FC are energized from the following pairs of buses L2, L3 and L2, L1 of the supply from which their associated following ignitrons 3I, 4I and 5I, 6I, respectively, are supplied. Each following network 2FC and 3FC is supplied from a transformer 2Y and 3Y having a pair of secondaries 41, 43 and 45, 47, respectively. The terminals of one of the secondaries 41 and 45 of each of the latter transformers 2Y and 3Y are connected respectively to the anodes 48 of pairs of auxiliary thyratrons 3AT, 4AT and 5AT, 6AT, respectively. Each common junction 49 and 51 of the cathodes 50 of each pair of auxiliary thyratrons is connected to the intermediate tap of the associated secondary 41 and 45, respectively, through the primary 5P and 6P, respectively, of the associated firing-control transformer 2X and 3X.

Each of the auxiliary thyratrons 3AT to 6AT associated with the last-mentioned firing-control networks includes two control electrodes 53 and 55. Between one of the control electrodes 55 of each auxiliary thyratron 3AT to 6AT and the corresponding common junction 49 and 51 of the cathodes 50, a time-constant network 3TC, 4TC, 5TC and 6TC consisting of a capacitor 57, 59, 61 and 63, respectively, shunted by a voltage divider 65, 67, 69 and 71, respectively, is connected through a bias 2AB and 3AB. The other control electrodes 53 of each pair of auxiliary thyratrons 3AT, 4AT and 5AT, 6AT are connected together through a tapped resistor 73 and 75 similar to the resistor 29 connecting the control electrodes 27 of the leading auxiliary thyratrons 1AT and 2AT. The center taps of these resistors are connected to the common junctions 49 and 51 of the cathodes 50 of the thyratrons 3AT and 4AT and 5AT and 6AT. A phase-shift network 2FS and 3FS including a resistor 77 and 79, a variable resistor 81 and 83 and a capacitor 85 and 87 is connected across each of the remaining secondaries 43 and 47 of the transformers 2Y and 3Y. The junction of the capacitor 85 and 87 and the resistor 81 and 83 of each of the networks and the intermediate tap of the secondary 43 and 47 are connected in each case to points 91 and 89 and 95 and 93, respectively, on the resistor 73 and 75 which are symmetrical electrically with respect to its center tap. Each of the auxiliary thyratrons 3AT, 4AT, 5AT and 6AT associated with the following firing-control networks 2FC and 3FC is thus controlled from its time-constant network 3TC, 4TC, 5TC and 6TC, respectively, and from the phase-shifted output of the secondary 43 and 47 associated with its firing-control network.

The firing-control networks 1FC, 2FC and 3FC are controlled from a frequency-determining circuit FD, which may be similar to that disclosed in my above-identified copending application or may have several of the other forms now available. This circuit FD is supplied from the same buses of the supply as the leading firing-control network 1FC and the associated ignitrons 1I and 2I, and produces one conditioning pulse during each period of the supply, the pulse being produced during the half cycle of either polarity depending upon the polarity of the load current which is to be supplied. The conditioning pulses of opposite polarity are derived from auxiliary buses 66 and 80, respectively, of the system shown in my copending application. To clarify the explanation, the corresponding buses of the system disclosed in this application are also labeled 66 and 80.

The auxiliary buses 66 and 80 each supply the primary of a transformer V and Z, respectively; each transformer V and Z has three secondaries 1V, 2V, 3V and 1Z, 2Z, 3Z, respectively. One of the secondaries 1V and 1Z of each of the transformers is connected in series between the control electrode 27 and the cathode 23 of the third auxiliary valve 7AT of the leading firing-control network 1FC. The other secondaries 2V, 3V, 2Z, 3Z are each respectively connected through a rectifier 3R, 4R, 5R and 6R across an associated time-constant network 3TC, 4TC, 5TC, 6TC of the following-firing-control networks 2FC, 3FC.

The operation of the apparatus is initiated by the closing of a manually actuable switch (not shown), such as a foot switch, associated with the welder. The frequency-determining circuit FD is then energized and transmits first a series of conditioning pulses during each half period of one polarity, which I shall call positive, of a train of periods of the supply through buses 66 and then a series of conditioning pulses during each half period of opposite polarity, which I shall call negative, of a train of periods of the supply through buses 80. The number of these pulses of any polarity is dependent on the low frequency desired. It may vary from one to approximately ten or fifteen.

The first conditioning pulse transmitted through the buses 66 is impressed between the control electrode 27 and the cathode 23 of the auxiliary thyratron 7AT of the leading firing-control network 1FC conditioning the latter and one of the associated thyratrons 1AT and 2AT to become conductive. Which of these latter thyratrons is so conditioned is determined by the instantaneous polarity of the associated secondary 15 of the transformer 1Y at the time when the auxiliary thyratron is conditioned. Assume that at this time the left-hand terminal of the secondary 15 is positive and the right-hand negative. The left-hand thyratron 1AT is then conditioned to become conductive. This thyratron actually conducts at an instant determined by the phase-shift network 1FS when the potential in its control circuit reaches the proper magnitude. Current then flows through this thyratron 1AT, the third auxiliary thyratron 7AT and the primary 4P of the associated transformer. Triggering potential pulses are now induced in the control circuits of the associated firing thyratrons 1T and 2T. At this time, one of these firing thyratrons 1T has a positive anode potential and the other 2T a negative anode potential. The triggering pulse in the former control circuit counteracts the bias 1B and thyratron 1T is rendered conductive, firing the ignitron 1I and causing current to flow upward through the corresponding primary 1P of the welding transformer W.

The conditioning pulse transmitted through the buses 66 also causes a potential to appear across the other secondaries 2V and 3V of the transformer V. The capacitors 57 and 61 in one of the time-constant networks 3TC and 5TC of each of the following control networks 2FC and 3FC are then charged in a sense tending to counteract the bias 2AB and 3AB. Each of the associated thyratrons 3AT and 5AT is then conditioned to become conductive. These thyratrons, however, do not conduct immediately because their anode-cathode potentials are of the improper polarity and magnitude for conduction. But the charge on the capacitors 57 and 61 is not immediately dissipated. It decays for a time interval determined by the setting of the associated voltage dividers 65 and 69, respectively. This setting is such that each thyratron 3AT and 5AT remains conditioned to conduct until its anode reaches the proper potential to conduct. Thereafter, each thyratron in its turn is rendered conductive at an instant predetermined by the setting of its associated phase-shift network 2FS and 3FS. The first thyratron 3AT to conduct then transmits current through the primary 5P of its associated firing-control transformer 2X and supplies triggering potential pulses through the secondaries 3S and 4S of this transformer to render one of the associated ignitrons 3I conductive. The ignitron 3I then conducts transmitting current upward through the corresponding primary 2P of the welding transformer W. By reason of the leakage flux between the primaries 2P and 1P of the welding transformer, a counter-potential is now impressed in the circuit of the initially conducting primary 1P, and its associated ignitron 1I is rendered non-conductive. The second ignitron 3I continues to conduct until the auxiliary thyratron 5AT of the firing-control network 3FC associated with the third pair of ignitrons 5I and 6I becomes conductive. The ignitron 5I associated with the third primary 3P of the welding transformer W is now rendered conductive, transmitting current through the third primary and causing the second ignitron 3I to become non-conductive.

The auxiliary thyratrons 7AT, 1AT, 3AT and 5AT are each rendered non-conductive during the first cycle of operation when the anode potential supplied to them through the secondaries 15, 41 and 45, respectively, become negative. At the beginning of the succeeding positive half period of the potential impressed on the leading buses $L_1$, $L_3$, a second conditioning pulse may now be supplied through the auxiliary buses 66. The thyratrons 7AT, 1AT, 3AT and 5AT are again rendered conductive in succession, and the above-described cycle of operation is repeated.

Load current may now have been conducted for a predetermined low-frequency half period. As is explained in my copending application, there is now a quiescent interval during which no pulses are transmitted from the frequency-determining circuit FD. This interval may have a duration of the order of one cycle. Thereafter, at the beginning of a negative half period of the potential supplied by the leading buses $L_1$, $L_3$, a conditioning pulse is transmitted through the auxiliary buses 80. The common thyratron 7AT and the right-hand auxiliary thyratron 2AT of the leading firing-control network 1FC are now rendered conductive at the selected instant in the positive half period. Current is supplied through the primary 4P of the firing-control transformer 1X, and the other ignitron 2I associated with the leading firing-control network 1FC is rendered conductive. Current of polarity opposite to that of the original current now flows through the first primary 1P of the welding transformer W.

The potential induced in the secondaries 2Z and 3Z of the transformer Z associated with auxiliary buses 80 causes the capacitors 59 of the time-constant networks 4TC and 6TC associated with the right-hand thyratrons 4AT and 6AT of the following control networks 2FC and 3FC to charge and conditions the right-hand thyratrons 4AT and 6AT to become conductive. When the anode potentials of these reach the proper magnitudes and the phase-shifted potentials in the control circuits (53) are of the proper magnitude, the right-hand thyratrons 4AT and 6AT of the following networks are rendered conductive, each in its turn. The associated ignitrons 4I and 6I are now rendered conductive, and current of opposite polarity to the original current is transmitted in succession through the associated primaries 2P and 3P of the welding transformer. At the beginning of the succeeding negative half period, a second conditioning pulse may be transmitted through the conductors 80, and the three ignitrons 2I, 4I, 6I rendered conductive, each in its turn. Depending on the setting of the frequency-determining circuit and its associated sequence timer, the above-described operation may now be repeated a predetermined number of times.

In the preferred practice of my invention, the low-frequency impulses transmitted through the welding transformer are alternately of opposite polarities. It is sometimes customary in the use of apparatus involving my invention to transmit trains of welding pulses which are all of one or the other polarities. This object may be accomplished in the practice of my invention by providing a switching system which at the will of the operator may disable one set or the ohter set of auxiliary thyratrons 1AT, 3AT, or 2AT, 4AT, 6AT; or firing thyratrons 1T, 3T, 5T or 2T, 4T, 6T or may prevent the supply of pulses through one or the other of the auxiliary bus pairs 66 or 80. Such a switching arrangement is shown in application Serial No. 185,068, filed Sept. 15, 1950, now Patent No. 2,701,852, to John R. Parsons and Herbert W. Von Ness and assigned to Westinghouse Electric Corporation.

The operation of the apparatus shown in Figs. 1 and 2 is illustrated in Figs. 3 and 4. In each of the graphs shown in this view, potential is plotted vertically and time horizontally. So that the graphs may not become too complex, the potential for one thyratron, say 1AT, of each pair (such as 1AT, 2AT) is plotted positive above the time axis and the potential for the other thyratron, say 2AT, of a pair is plotted positive below the axis. The anode potentials for both thyratrons are thus represented by a single curve although they are of opposite polarity.

Fig. 3a illustrates the operation of the leading firing-control network 1FC. The full-line sine curve of the higher amplitude is a plot of the anode potential impressed on the auxiliary thyratrons 1AT, 2AT. These thyratrons are conditioned to become conductive by the pulses impressed from the buses 66 at the beginnings of positive half periods of the supply. The latter pulses are represented by the full-line irregular curves on both sides of the time axis. The sine wave of smaller amplitude corresponds to the control potential supplied through the phase-shift network 1FS. The auxiliary thyratrons are actually rendered conductive at the instants when this potential becomes positive. The conductive intervals are represented by the shading under the anode potential curves.

The effect of this conduction is illustrated in Fig. 4. The sine waves of Fig. 4a displaced by 120° are plots of the anode potential impressed on the ignitrons 1I to 6I from the phase $L_1$, $L_3$; $L_3$, $L_2$ and $L_2$, $L_1$ of the supply. The curve of Fig. 4b is identical to the anode potential curve of Fig. 3a. As shown the anode potential impressed on the auxiliary thyratrons 1AT and 2AT of the leading firing-control circuit is in phase with the anode potential impressed on the corresponding leading ignitrons 1I and 2I. The shaded areas under the sine waves of Fig. 4a correspond to the conductive intervals of the corresponding ignitrons 1I to 6I.

In Fig. 3b, the voltage impressed on the auxiliary thyratrons 3AT and 4AT of the first following firing-control network 2FC is represented by a sine wave. The voltage of the associated time-constant networks 3TC and 4TC is represented by the triangular-shaped curves, those above the time axis corresponding to the left-hand thyratron 3AT and those below the time axis corresponding to the right-hand thyratron 4AT. The rising portions of these curves correspond to the interval during which the capacitor 57 or 59 is charged. This interval starts at the beginning of the positive or negative half period of the voltage supplied to the leading firing-control network 1FC because it is at this instant that the conditioning pulse is impressed through the buses 66 or 80. The potential decays during the succeeding period as represented by the falling portions of the curves, remaining, positive substantially until the end of the half period of positive potential impressed on the thyratron 3AT or 4AT. So long as the potential provided by the time-constant network remains positive, the thyratrons 3AT or 4AT are conditioned to conduct. It actually becomes conductive at an instant in the positive half period by the setting of the phase-shift network 2FS. This operation may be illustrated graphically by a curve similar to the sine wave curve of low amplitude of Fig. 3a, but it is not added to Fig. 3b to avoid confusion. The conductive intervals of the left-hand and right-hand thyratrons 3AT and 4AT of the first following firing-control circuit are represented by shaded areas of the anode curve. The first following ignitrons 3I and 4I are rendered conductive in the same manner as the leading ignitrons 1I and 2I when the corresponding thyratrons become conductive. The conductive intervals are illustrated by the shaded area under the second sine wave of Fig. 4a. The corresponding auxiliary thyratron potential is shown in Fig. 4c.

Fig. 3c corresponds to Fig. 3b but is the graph for the second following firing-control network 3FC. In this case, the capacitor potential of the time-constant networks 5TC and 6TC decay so slowly that they remain positive until the end of the positive half period of potential impressed on the associated auxiliary thyratrons 5AT and 6AT. These thyratrons then remain conditioned to become conductive until their anode and control potentials are of the proper polarity. Thereafter, they are rendered conductive, and the conductive intervals are indicated by the shaded area under the anode potential curve of Fig. 3c and Fig. 4d. The conduction of the corresponding ignitrons 5I and 6I is illustrated in Fig. 4a by the shaded area under the third sine wave.

A system is thus disclosed herein which includes a relatively simple and low-cost firing control circuit for the ignitrons of a low-frequency welder. The phase-shift networks 1FS, 2FS, 3FS supply only grid power to the thyratrons 1AT to 6AT and are, therefore, light and of low cost. No heavy resistors establishing a neutral are included. The system can, therefore, be made and sold at a substantially lower cost than the system shown in my copending application. Because its operation is less complex than my earlier system, the servicing cost, which it involves, is substantially lower than that demanded by my earlier system.

The system disclosed herein does not include a network for producing late firing of the first ignitrons of each group to fire, such as is included in the system disclosed in my copending application Serial No. 102,478, filed July 1, 1949, now Patent No. 2,619,625, and assigned to Westinghouse Electric Corporation. A system including such a network is within the scope of my invention. Such a system would include a third network including a pair of thyratrons respectively conditioned to become conductive when corresponding thyratrons 5AT and 6AT of network 3FC are rendered conductive. These thyratrons are rendered conductive to supply pulses to render the ignitrons 1I and 2I conductive late in their half periods.

While I have shown a certain specific embodiment of my invention, I am fully aware that modifications thereof are possible. My invention, therefore, is not to be restricted except insofar as is necessitated by the prior art and by the spirit of the appended claims.

I claim as my invention:

1. In combination a first winding having an intermediate tap, a second winding having an intermediate tap; a pair of discharge paths each defined by an anode and a cathode and having a first control electrode and a second control electrode; connections between said anodes of said paths and the terminals of said first winding, respectively; a connection between the cathodes of said paths and said intermediate tap of said first winding; a phase-shift network connected across the terminals of said second winding; a connection between the first control electrode of one path and an intermediate electrical point on said network; a connection between said intermediate tap of said second winding and the first control electrode of said other path; and time-constant networks connected between said second control electrode and said cathode of each said path.

2. Apparatus for controlling the supply of power from an $n$ phase source comprising, in combination, a leading valve means and $n-1$ following valve means, each said valve means being conditioned to become conductive only when a potential greater than a predetermined potential is impressed thereon; means for impressing a potential pulse on said leading valve means greater than said predetermined potential for said leading valve means and delay means responsive to said pulse for impressing a decaying potential on each said following valve means greater than said predetermined potential for said following valve means, said decaying potential on each said valve means remaining greater than said predetermined potential for a time interval at least substantially equal to $$\frac{(n-1)T}{2}+\frac{T}{n}$$

where T is a period of said source.

3. Apparatus for controlling the supply of power from an $n$ phase source comprising, in combination, a leading valve means and $n-1$ following valve means, each said valve means being conditioned to become conductive only when a potential greater than a predetermined potential is impressed thereon; means for impressing a potential pulse on said leading valve means greater than said predetermined potential for said leading valve means and delay means responsive to said pulse for impressing a decaying potential on each said following valve means greater than said predetermined potential for said following valve means, said decaying potential on each said valve means remaining greater than said predetermined potential for progressively greater time intervals, the smallest of said intervals being of the order of T where T is a period of said source, and the largest being of the order of $$\frac{(n-1)T}{2} + \frac{T}{n}$$

and the difference between each interval and a just greater interval being of the order of T.

4. Converting apparatus for controlling the supply of power from an $n$-wire, $n$-phase source to a load comprising in combination $n$ main electric discharge devices each adapted to be rendered conductive by impressing a pulse thereon; $n$ circuits each including one of said main devices and each adapted to connect said one device between a different pair of said $n$ wires and said load, said one device being adapted to be connected between only said pair of said wires; and $n$ pulse supply circuits each connected to supply a pulse to a corresponding one of said devices to render said one device conductive and each adapted to be energized and to derive said pulse only from the pair of $n$ wires between which and the load said corresponding device is connected.

5. Converting apparatus for controlling the supply of power from an $n$-wire, $n$-phase source to a load comprising in combination $n$ main electric discharge devices each adapted to be rendered conductive by impressing a pulse thereon; $n$ circuits each including one of said main devices and each adapted to connect said one device between a different pair of said $n$ wires and said load, said one device being adapted to be connected between only said pair of wires; and $n$ pulse supply circuits each connected to supply a pulse to a corresponding one of said devices to render said one device conductive and each adapted to be energized and to derive said pulse only from the pair of $n$ wires between which and the load said corresponding device is connected, each pulse supply circuit including phase-shift means for setting the instants in the half periods of the potential of the wires from which it is energized at which said pulse is impressed on the corresponding device.

6. Converting apparatus for controlling the supply of power from an $n$-wire, $n$-phase source to a load comprising in combination $n$ main electric discharge devices each adapted to be rendered conductive by impressing a pulse thereon; $n$ circuits each including one of said main devices and each adapted to connect said one device between a different pair of said $n$ wires and said load, said one device being adapted to be connected between only said pair of wires; and $n$ pulse supply circuits each connected to supply a pulse to a corresponding one of said devices to render said one device conductive and each adapted to be energized and to derive said pulse only from the pair of $n$ wires between which and the load said corresponding device is connected, each pulse supply circuit including an individual phase-shift network for setting the phase in the half periods of the potential of the corresponding wires from which it is energized at which said pulse is impressed on the corresponding device.

7. Apparatus for controlling the magnitude of the current supplied by a converter which functions to derive power from a polyphase source and supply power to a load at a substantially lower frequency than that of said source, which converter includes a plurality of main electric discharge means each adapted to be rendered conductive by pulses and each adapted to be connected between a different phase of said source only and said load; comprising in combination means for supplying a pulse during each period of a predetermined number of periods of one phase of said source; a plurality of potential actuable networks each connected to an associated main discharge means; means for impressing potential from said source on each said network which potential is in phase with the potential impressed on the associated main discharge means; and means responsive to a pulse from said pulse supply means to condition each said network in its turn to supply a pulse to render said associated main discharge means conductive; each said network including means for actuating it while it is so conditioned, to supply said pulse to render said associated device conductive at a predetermined instant in the periods of the phase of said source between which said associated device is connected.

8. Apparatus for controlling the magnitude of the current supplied by a converter which functions to derive power from a polyphase source and to supply power to a load at a substantially lower frequency than that of said source, which converter includes a plurality of main electric discharge means each adapted to be rendered conductive by pulses and each adapted to be connected only between a different phase of said source and said load; comprising in combination means for supplying a pulse during each period of a predetermined number of periods of one phase of said source; a plurality of potential actuable networks each connected to an associated main discharge device; means for impressing potential from said source on each said network which potential is in phase with the potential impressed on the associated main discharge means; means responsive to a pulse from said pulse supply means to condition each said network to supply a pulse to render said associated main discharge means conductive; each said network including means cooperative with said potential-impressing means for causing said network to supply a pulse at a predetermined phase angle relative to the phase of said in-phase potential.

9. Apparatus for controlling the magnitude of the current supplied by a converter which functions to derive power from a polyphase source and supply power to a load at a substantially lower frequency than that of said source, which converter includes a plurality of main electric discharge means each adapted to be rendered conductive by pulses and each adapted to be connected only between a different phase of said source and said load; comprising in combination means for supplying a pulse during each period of a predetermined number of periods of one phase of said source; a plurality of potential actuable networks each connected to an associated main discharge means, said plurality of networks consisting of a leading network and following networks; means for impressing potential from said source on each said network which potential is in phase with the potential impressed on the associated main discharge means and the potential impressed on said leading network being in phase with said one phase of said source; means responsive to a pulse from said pulse supply means to condition each network to supply a pulse to render said associated main discharge means conductive, each said network including means cooperative with its potential-impressing means for causing it to supply a pulse at a predetermined phase angle relative to the phase of said in-phase potential, and each following network including means for delaying the pulse produced thereby so that it occurs when the potential impressed on the main discharge means associated with said network is positive.

10. Converting apparatus for controlling the supply of power from an $n$-wire, $n$-phase source to a load comprising in combination, $n$ power circuits each including at least one main electric discharge device and connections adapted to connect said main device directly between said load and a pair of the wires of said source, each of said devices having a control circuit; a leading heat-control network and n—1 following heat-control networks, each of said networks including input and output terminals; connections for connecting the output terminals of each network to the control circuit of an associated discharge device; connections for supplying potential to each said network from the pair of wires to which the associated discharge device of each is connected; connections from the pair of wires from which said leading network is supplied to the input circuits of all said networks for supplying pulses during alternate half periods of the potential of said last-named pair of wires to condition said networks to supply potential through their output terminals to the control circuits of associated discharge devices; and an actuating circuit connected to each of said networks for causing each network to supply said potential through its output terminals at predetermined instants during the positive half periods of the potential supplied to each network by each said pair of wires.

11. In combination an electric discharge path defined by an anode and a cathode and having a first control electrode and a second control electrode; a phase-shift network connected between said first control electrode and said cathode; a time-constant network connected between said second control electrode and said cathode; a first circuit for supplying a pulse to said time-constant network of such polarity as to condition said discharge path to become conductive; and a second circuit for supplying potential to said phase-shift network rendering said path conductive at a predetermined instant as set by said phase-shift network while it is so conditioned.

12. In combination a plurality of transformers each having a secondary with an intermediate tap; a plurality of pairs of electric discharge paths, each path defined by an anode and a cathode and having a control electrode, the anodes of each pair being connected to the terminals of a corresponding secondary; an auxiliary electric discharge path defined by an anode and a cathode, said last-named anode being connected to the cathodes of one of said pairs of paths and the cathode of said auxiliary paths being connected to the intermediate tap of the associated transformer; time-constant networks connected between the control electrodes and cathodes of said other pairs of paths; and a circuit for supplying potential simultaneously to said auxiliary path and said networks, said potential being of a polarity and magnitude such as to render said auxiliary path conductive and to condition said other pairs of paths to become conductive.

13. In combination a plurality of transformers each having a secondary with an intermediate tap; a leading pair of discharge paths, each path defined by an anode and a cathode, the anodes of said paths being connected each to a terminal of an associated secondary; an auxiliary electric discharge path defined by an anode and a cathode, said last-named anode being connected to the cathodes of said first-named paths and said cathode of said auxiliary path being connected to the intermediate tap of said associated secondary; following pairs of discharge paths, each path defined by an anode and a cathode and each path having a control electrode, the anodes of the paths of each following pair being connected to the terminal of an associated secondary and the cathodes being connected to the intermediate tap of said associated secondary; a time-constant network connected between the control electrode and the cathode of each path of the following pairs and a circuit for supplying control potential simultaneously to said auxiliary path and to said networks.

14. In combination a plurality of transformers each having a first secondary with an intermediate tap and a second secondary; a leading pair of discharge paths, each path defined by an anode and a cathode and having a control electrode, the anodes of said paths being connected each to a terminal of an associated first secondary and said control electrodes being connected to the second secondary of the transformer of said associated first secondary through a phase-shift network; an auxiliary electric discharge path defined by an anode and a cathode, said last-named anode being connected to the cathodes of said first-named paths and said cathode of said auxiliary path being connected to the intermediate tap of said associated secondary; following pairs of discharge paths, each path defined by an anode and a cathode and each path having a first control electrode and a second control electrode, the anodes of the paths of each following pair being connected to the terminals of an associated secondary and the cathodes being connected to the intermediate tap of said associated secondary and said first control electrode of each path of each following pair being connected to a second secondary of the transformer of said associated first secondary through a phase-shift network; a time-constant network connected between the second control electrode and the cathode of each path of the following pairs; and a circuit for supplying control potential simultaneously to said auxiliary path and to said networks.

15. Apparatus for controlling a converter for supplying power in discrete pulses each of a predetermined duration from a polyphase source to a single phase load, said converter including valve means interposed between the phases of said source and said load which valve means is to be rendered conductive during any discrete pulse to transmit current from each phase of said source in succession to said load, said apparatus comprising in combination a firing control circuit for each phase of said source for rendering said valve means conductive to transmit current in its turn from its corresponding phase of said source thru said load, each said firing control circuit including means for deriving a potential from a phase of said source which is a different phase for each firing control circuit, each deriving means including end terminals and an intermediate terminal, a pair of electric discharge paths each defined by principal electrodes and having a control electrode, means for connecting the principal electrodes of each said pair in a push-pull circuit with said deriving means, means coupled to said push-pull circuit and connected to said valve means for controlling the conductivity of said valve means as aforesaid and phase shift means connected between said control electrode and one of said principal electrodes of each of said paths.

16. Apparatus according to claim 9 characterized by the fact that each pulse supplied to the main electric discharge means from the leading network is supplied through a pair of auxiliary discharge devices connected in series, by means for rendering one of said discharge devices conductive at a predetermined instant in any positive half period of the source and by means for rendering the other of said discharge devices conductive in response to a pulse impressed from the pulse supply means; and by the further fact that each pulse supplied to the main electric discharge means from the following networks is supplied through only one auxiliary discharge device, by means for rendering said one device conductive at a predetermined instant during any positive half period of said source and by delay means responsive to a pulse from said pulse supply means for conditioning said one device to become conductive when its potential becomes positive.

References Cited in the file of this patent

UNITED STATES PATENTS

| | | |
|---|---|---|
| 2,372,017 | Rogers | Mar. 20, 1945 |
| 2,397,089 | Cox | Mar. 26, 1946 |
| 2,404,643 | Livingston | July 23, 1946 |
| 2,428,586 | Rose | Oct. 7, 1947 |
| 2,473,237 | Bivens | June 14, 1949 |